United States Patent Office 3,462,402
Patented Aug. 19, 1969

3,462,402
THREADS, FIBERS, FABRICS, TAPES AND FILMS BASED ON POST-CHLORINATED POLYVINYL CHLORIDE, AND METHOD FOR PRODUCTION THEREOF
Robert Büning, Oberlar, Karl-Heinz Diessel, Troisdorf, and Hans Ewald Konermann, Oberlar, Germany, assignors to Dynamit Nobel Aktiengesellschaft, Troisdorf, Germany, a corporation of Germany
No Drawing. Filed Jan. 12, 1966, Ser. No. 520,550
Claims priority, application Germany, Jan. 20, 1965,
D 46,304
Int. Cl. C08f 27/02
U.S. Cl. 260—92.8    7 Claims

ABSTRACT OF THE DISCLOSURE

Thin material including threads, fibers, fabrics, tapes, and films, said material comprising post-chlorinated syndiotactic polyvinyl chloride obtained by post-chlorination of syndiotactic polyvinyl chloride containing about 55–80% of syndiotactically ordered chlorine radicals, and having a density of about 1.41–1.55 and K-value of about 50–90, said material being pre-stretched along at least one axis.

---

It is known how to prepare thin materials such as threads, fibers, fabrics, tapes and films from post-chlorinated polyvinyl chloride. A raw material proved to be particularly useful was obtained by the post-chlorination of porous polyvinyl chloride, for example suspension polyvinyl chloride of the dry-blend type, where chlorination took place in an aqueous hydrochloride suspension with the use of swelling agents, as for example chloroform, possibly in the presence of UV light or the like. The density of the polyvinyl chloride post-chlorinated in such a maner is about 1.55, or it may be between 1.45 and 1.55. The shrinkage at 100° C. of such stretched threads, for example in boiling water, is 0.7% at a density of 1.55 but at a density of 1.46 it is 12%.

On the other hand, if post-chlorinated syndiotactic polyvinyl chloride, originally containing 55 to 80% of syndiotactically ordered chlorine atoms (tacticity determined according to H. Germar et al., Macromol, Chem. 60, 106–119 (1963)), and of a density (determined by the suspension method according to Houben-Weyl, Meth. der org. Chemie, vol. III/1, pp. 193-195) between 1.41 and 1.55, and preferably less than about 1.5, and with K-values (H. Fikentscher, Cellulosechemie, 13, 60 (1932)) between 50 and 90, and preferably between 60 and 80, is used, and then the products are stretched monoaxially or biaxially in a manner known per se, for example from 3 to 12 fold, and preferably from 7 to 12 fold, at temperatures between 100, or preferably 130, and 160° C., products are obtained which even at low densities show only small shrinkages, for example in boiling water a shrinkage of less than about 3%. For the 3% shrinkage the density can be about 1.418. This type of post-chlorinated syndiotactic polyvinyl chloride is obtained, for example, by the post-chlorination of the corresponding syndiotactic polyvinyl chloride in a hydrochloride aqueous suspension by the use of chloroform as the swelling agent and by the use of UV light at chlorination temperatures between +15° C. and +30° C., as, for instance, described in Belgian Patent No. 643,500.

According to the invention, it is possible, for example, to prepare threads and fibers of a lower density than the fibers and threads known heretofore, based on post-chlorinated polyvinyl chloride, which display only negligible shrinkage at 100° C. This corresponds to the technical requirements for lighter, chemical resistant, temperature resistant and flame resistant fabrics.

EXAMPLES

In the following table, a post-chlorinated atactic polyvinyl chloride and a post-chlorinated syndiotactic polyvinyl chloride are compared. The corresponding products have, with the limits of error, the same K-values (about 70) and the same densities. They differ, however, in their steric configuration. Here, in the post-chlorinated syndiotactic polyvinyl chloride, the chlorine atoms originating from the syndiotactic polyvinyl chloride used for the chlorination should be distributed along the polymer chain in at least 55% syndiotactic arrangement. The properties of the stretched threads are compared in the table. Similar results are obtained in the case of biaxially stretched films. The individually different stretching ratios or stretch temperatures are determined by the properties of the products. In the table, "syn." means syndiotactic; "atact." means tactic.

| Density | | Stretch ratio | | Stretch temp., ° C. | | Shrinkage at 100 ° C., percent | | Tensile strength, g./den. | |
|---|---|---|---|---|---|---|---|---|---|
| Syn. | Atact. | Syn. | Atact. | Syn. | Atact. | Syn. | Atact. | Syn. | Atact. |
| 1.418 | 1.421 | 8.2 | 4.0 | 129 | 100 | 3 | 65 | 3.5 | 1.3 |
| 1.459 | 1.460 | 10.1 | 6.5 | 145 | 135 | 0.8 | 12 | 4.8 | 1.45 |
| 1.519 | 1.521 | 11.5 | 9.6 | 148 | 140 | 0.2 | 1.3 | 5.5 | 2.53 |
| 1.550 | 1.550 | 11.0 | 9.5 | 149 | 140 | 0.05 | 0.7 | 5.3 | 2.3 |

The threads of post-chlorinated syndiotactic polyvinyl chloride may be prepared by the dry spining process or the wet spinning process. Suitable solvents are for example: tetrahydrofuran, cyclohexanone, cyclopentanone and propylene oxide. In contrast to post-chlorinated atactic polyvinyl chloride, less suitable solvents or mixtures are: benzene/acetone, carbon disulfide/acetone and dimethyl formamide. Other thin materials such as fibers, fabrics, tapes, and films can be made in a known manner, i.e. by working the polyvinyl chloride, for example by expressing, calendering, etc., to a form having at least one dimension of great magnitude relative to another dimension thereof.

What is claimed is:
1. Thin material including threads, fibers, fabrics, tapes, and films, said material consisting essentially of post-chlorinated syndiotactic polyvinyl chloride obtained by post-chlorination of syndiotactic polyvinyl chloride containing about 55–80% of syndiotactically ordered chlorine radicals, and having a density of about 1.41–1.55 and K-value of about 50–90, said material being pre-stretched along at least one axis.

2. Material according to claim 1, shrinkage from exposure to water at 100° C. being less than about 3%.

3. Material according to claim 1, having a density of less than about 1.5.

4. Material according to claim 2, having a density of about 1.418.

5. Method for producing thin material including threads, fibers, fabrics, tapes, and films, said method comprising post-chlorinating syndiotactic polyvinyl chloride containing about 55–80% of syndiotactically ordered chlorine radicals, and thereby producing post-chlorinated syndiotactic polyvinyl chloride having a density of about 1.41–1.55 and K-value of about 50–90, and stretching said post-chlorinated polyvinyl chloride along at least one axis to reduce shrinkage thereof.

6. Method according to claim 5, said stretching being at 100–160° C. and from about 3–12 fold.

7. Method according to claim 1, the shrinkage being reduced to less than about 3%.

References Cited

UNITED STATES PATENTS

| | | |
|---|---|---|
| 2,996,489 | 8/1961 | Dannis et al. |
| 3,100,762 | 8/1963 | Shockney. |
| 3,372,219 | 3/1968 | Gord _____ 264—210 |

DONALD J. ARNOLD, Primary Examiner

T. H. WOO, Assistant Examiner

U.S. Cl. X.R.

161—46, 168; 264—83, 210

PO-1050
(5/69)

UNITED STATES PATENT OFFICE
CERTIFICATE OF CORRECTION

Patent No. 3,462,402     Dated August 19, 1969

Inventor(s)  Robert Büning, et al.

It is certified that error appears in the above-identified patent and that said Letters Patent are hereby corrected as shown below:

Patent, column 2, Table, line 3, "129" should read --139--.

SIGNED AND
SEALED

DEC 9 - 1969

(SEAL)
Attest:

Edward M. Fletcher, Jr.
Attesting Officer

WILLIAM E. SCHUYLER, JR.
Commissioner of Patents